United States Patent [19]

Fox

[11] Patent Number: 5,203,391
[45] Date of Patent: Apr. 20, 1993

[54] WHEEL MOUNTING FOR TIRE PRESSURE ADJUSTMENT SYSTEM

[75] Inventor: Gerald P. Fox, Canton, Ohio

[73] Assignee: The Timken Company, Canton, Ohio

[21] Appl. No.: 670,344

[22] Filed: Mar. 15, 1991

[51] Int. Cl.$^5$ ............................................. B60C 23/00
[52] U.S. Cl. ..................................... 152/416; 152/415
[58] Field of Search ......................... 152/415, 416, 417

[56] References Cited

U.S. PATENT DOCUMENTS

| | | | |
|---|---|---|---|
| 2,976,906 | 3/1961 | Kamm et al. | 152/417 |
| 4,431,043 | 2/1984 | Goodell et al. | 152/417 |
| 4,498,709 | 2/1985 | Wells et al. | 152/417 X |
| 4,582,107 | 4/1986 | Scully | 152/417 |
| 4,730,656 | 3/1988 | Goodell et al. | 152/417 |
| 4,733,707 | 3/1988 | Goodell et al. | 152/417 |
| 4,883,106 | 11/1989 | Schultz et al. | 152/417 |

Primary Examiner—Michael W. Ball
Assistant Examiner—Francis J. Lorin
Attorney, Agent, or Firm—Polster, Lieder, Woodruff & Lucchesi

[57] ABSTRACT

A mounting for a wheel having a pneumatic tire includes a hub to which the wheel is attached, a spindle about which the hub and wheel rotate, and a pair of indirectly mounted tapered roller bearings between the spindle and hub. The end of the hub is closed by a seal carrier which is attached to the hub and an end cover which is attached to the carrier. The end cover forms one end of a sealed chamber that is at the end of the spindle. The opposite end of the chamber is closed by a seal which is carried by the seal carrier beyond the two tapered roller bearings. The seal has an elastomeric seal element which bears against a sealing surface that is, in effect, carried by the spindle. One passageway extends from a location on the spindle that is remote from the bearing, along the spindle to the chamber at the end of the spindle. Another passageway extends from the exterior of the hub through the end ring to the chamber. The former is connected to a source of pressurized air, whereas the latter is connected to the interior of the pneumatic tire. Thus, the mounting permits the transfer air to or from the tire while the wheel rotates.

24 Claims, 3 Drawing Sheets

WHEEL MOUNTING FOR TIRE PRESSURE ADJUSTMENT SYSTEM

BACKGROUND OF THE INVENTION

This invention relates in general to mountings for the road wheels of automotive vehicles, and more particularly to wheel mountings that have the capacity to transfer pressurized air to or from the pneumatic tires as the wheels rotate.

The typical automotive vehicle rides on pneumatic tires mounted on metal rims, with the tires and rims forming the road wheels for the vehicle. The rims are in turn bolted to some type of hub which turn on bearings. Typically, the tires are inflated to a pressure specified by the manufacturer, and left at that pressure. Many individuals virtually ignore the tires, checking the pressure in them at only infrequent intervals, which is indeed a dangerous practice.

Not all driving conditions demand the same inflation pressure for the tires on a vehicle. Obviously, high speed highway driving requires greater pressure than low speed driving in congested urban areas where the tires, by virtue of the lower speeds, are not likely to reach elevated temperatures. This is convenient because urban streets are often rougher than highways, so lower tire pressures enable the tires to absorb impacts that would be transferred to the vehicle chassis at higher pressures. Similarly, so-called off road vehicles, such as those used by the military, are expected to operate on a wide variety of terrain, as well as on paved road surfaces. But much of the off road terrain requires greater traction than paved roadways, and this increased traction can be derived through a reduction in tire pressure. But this requires releasing air from the tires on a multi-wheeled vehicle, which is time consuming and often of little avail once the wheels becomes mired in mud or sand. Just as significant, when the vehicle again comes to a paved surface, its tires must carry enough pressure to operate on such a surface at reasonable speeds. If the tire has been deflated to increase traction, it again needs to be inflated, but facilities for inflating tires are not always nearby. Even a vehicle that operates totally on paved surfaces, may encounter conditions where increased traction is desirable, such as snow and ice, or even a rain-slickened street, traction that could be obtained simply by reducing the pressure of the air in its tires, but most drivers are reluctant to undertake the procedures to release air, particularly in inclement weather.

Wheel mountings exist for automotive vehicles, or have at least been disclosed, which place the tires of road wheels in communication with central air reservoirs on such vehicles where the air is maintained under pressure. The wheel mountings utilize bearings organized in pairs and in opposition, and those mountings transmit the air through the spaces between the bearings of each pair. The bearings require special seals to prevent the pressurized air from flushing their lubricants into the tires or air reservoir.

The present invention resides in a mounting including a hub and a spindle as well as bearings located between the hub and spindle. A sealed chamber exists at the end of the spindle and remote from the bearings, it being isolated from the bearings by a live seal. A passageway extends along the spindle to the sealed chamber and another extends from the hub to the chamber, thus enabling pressurized air to be transmitted through the mounting while the hub rotates.

DESCRIPTION OF THE DRAWINGS

In the accompanying drawings which form part of the specification and wherein like numerals and letters refer to like parts wherever they occur.

DETAILED DESCRIPTION

Figure 1:
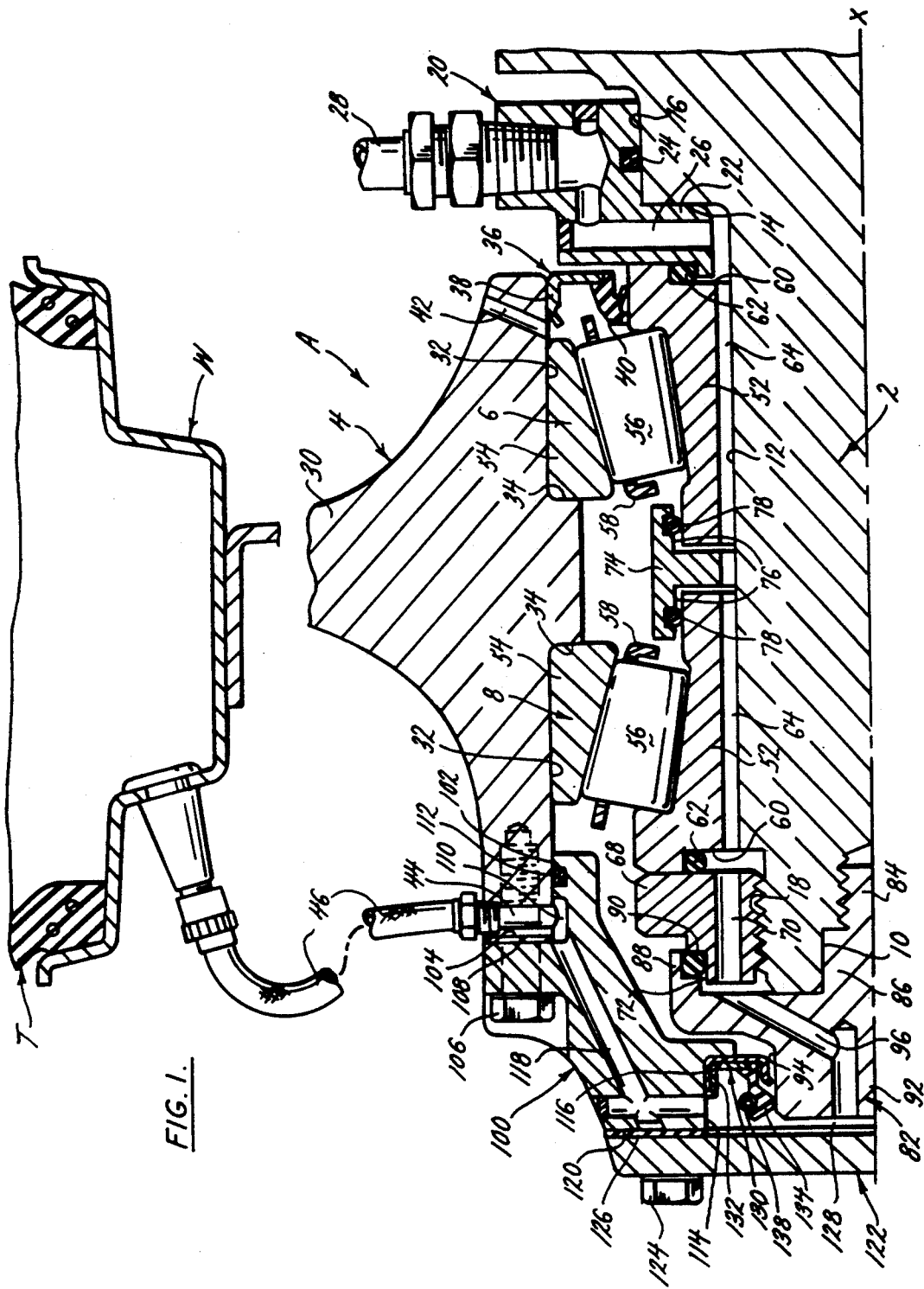
FIG. 1 is a half sectional view of a wheel mounting constructed in accordance with and embodying the present invention and further showing a tire which is connected to a source of compressed air through the mounting.

Referring now to the drawings, a mounting A (FIG. 1) for a road wheel W of an automotive vehicle enables pressurized air to be transmitted from an air reservoir on the vehicle to a pneumatic tire T on the road wheel W, while the vehicle is in operation, that is to say while the wheel W is rotating. The mounting A basically includes a spindle 2 which is fixed against rotation, a hub 4 which encircles the spindle 2, and inboard and outboard bearings 6 and 8 which are interposed between the spindle 2 and hub 4 to enable the latter to rotate around the former, indeed, about an axis X of rotation which coincides with the center axis of the spindle 2. Each of the bearings 6 and 8 has the capacity to transfer both radial and thrust loads, and those bearings 6 and 8 are mounted in opposition in the indirect configuration.

At its very end, the spindle 2 has a socket 10 which opens out of its end face, with the axis of the socket 10 coinciding with the axis X of rotation. Externally, the spindle 2 also has a cylindrical surface 12 which has its axis coinciding with the axis X so the socket 10 and surface 12 are concentric. The cylindrical surface 12 leads away from the end face out of which the socket 10 opens, ending at a remote shoulder 14 which leads out to an enlarged seating surface 16, and that surface 16 is concentric with the surface 12. Actually, the surface 12 does not run fully out to the free end of the spindle 2, but instead a short run of threads 18 exists between that free end and the surface 12.

The spindle 2 in the region of its shoulder 14 carries a ported collar 20 which fits around the seating surface 16 and has an inwardly directed flange 22 which abuts the shoulder 14, yet, being of a greater diameter than the cylindrical surface 12, is separated slightly from that surface. The collar 20 carries an O-ring seal 24 which establishes a static fluid barrier between the collar 20 and the seating surface 16. The collar 20 also contains a channel 26 which leads from the inside face of the flange 22 to a port located outwardly from the seating surface 16 where it is offset from the inboard end of the hub 4. The port of the channel 26 is connected to an air line 28 at a threaded coupling, and the air line 28, in turn, is connected to a source of compressed air in the vehicle.

The hub 4, which is hollow, fits around the spindle 2 and has an outwardly directed flange 30 to which the road wheel W is bolted. The hub 4 contains two bores 32 which lead away from shoulders 34 within the center of the hub 4. and the bores 32 open out of two ends of the hub 4. The spindle 2 fits through the two bores 32, and indeed, the surfaces of the bores 32 are presented inwardly toward the extended cylindrical surface 12 of the spindle 2.

The annular space between the hub 4 and the spindle 2 at the inboard end of the hub 4 is closed by a seal 36 including a case 38 which is pressed into the hub 4 at the end of its inboard bore 32 and an elastomeric sealing element 40 which is bonded to the case 38 and cooperates with the inboard bearing 6 to establish a live or dynamic barrier at that bearing. The barrier retains lubricant within the bearings 6 and 8 and excludes contaminants. Immediately inwardly from the seal 36, the hub 4 is fitted with a relief valve 42.

At its opposite end the hub 4 has a radial port 44 which extends from the outboard bore 32 to the exterior surface of the hub 4. The port 44 is connected with an air line 46 by a threaded coupling, and the air line 46, in turn, leads to and connects with a valve stem for the tire T of the road wheel W that is bolted to the flange 30 of the hub 4.

The two bearings 6 and 8, which are arranged in the indirect configuration, fit around the extended cylindrical surface 12 of the spindle 2 and into the bores 32 of the hub 4, the bearing 6 being in the inboard bore 32 and the bearing 8 being in the outboard bore 32. Each bearing 6 and 8 is a single row tapered roller bearing and as such includes an inner race or cone 52, an outer race or cup 54 and a complement of tapered rollers 56 organized in a single row between opposing raceways on the cone 52 and cup 54. Each bearing 6 and 8 also includes a cage 58 which maintains the proper spacing between its rollers 56 and further holds the rollers 56 around the cone 52 when the cone 52 is withdrawn from the cup 54. Being a single row tapered roller bearing, each of the bearings 6 and 8 has the capacity to transmit not only radial loads, but also thrust loads in the direction that seats the rollers 56 along the raceways of the cone 52 and cup 54. Those end faces of the cone 52 and cup 54 to which such thrust loading is applied are known as the back faces, whereas the opposite end faces are called the front faces. The cups 54 of the two bearings 6 and 8 are conventional, but the cones 52 are slightly modified. Like any other cone, each cone 52 has a thrust rib and an end rib at opposite ends of its raceway, the cone back face being on the former end the front face being on the latter. In addition, each cone 52 has a shallow counterbore 60 which opens out of its back face. The counterbore 60 contains O-ring seals 62. Each cone 52 also has several axially directed channels or slots 64 which extend from the counterbore 60 to front face along the bore. Indeed, the slots 64 open into the bore of the cone 52 and thus extend along the cylindrical surface 12 of the spindle 2.

The cone 52 of the inboard bearing 6 fits with minimal clearance over the cylindrical surface 12 of the spindle 2 with its back face abutting the flange 22 on the collar 20. The diameter of the counterbore 60 exceeds the inside diameter of the flange 22 on the collar 20, and the O-ring seal 62, being along the surface of the counterbore 60, is compressed between the flange 22 and the base of the counterbore 60, thus establishing a fluid-tight barrier between the cone 52 and collar 20. The cup 54 of the inboard bearing 6 fits with an interference fit into the inboard bore 32 of the hub 4 with its back face against the shoulder 34 in the hub 4.

The cup 54 of the outboard bearing 8 fits into outboard bore 32 of the hub 4 with its back face against the shoulder 34 at the end of that bore. Thus, the back faces of the two cups 54 are presented toward each other. The cone 52 of the outboard bearing 8 fits with minimal clearance over the cylindrical surface 12 of the spindle 2 with its front face presented toward the front face of the cone 52 for the inboard bearing 8. Thus, the two bearings 6 and 8 are mounted in opposition, so that the bearing 6 will transfer thrust in one direction and the bearing 8 will transfer thrust in the opposite direction. The arrangement is called an indirect mounting.

The back face for the cone 52 of the outboard bearing 8 bears against a nut 68 which engages the threads 18 at the end of the spindle 2. The O-ring seal 62 in the counterbore 60 of that cone 52 lies compressed within the counterbore 60 and thereby establishes a fluid-tight barrier between the cone 52 and the nut 68. The nut 68 contains several axial holes 70 which lie inwardly from the O-ring seal 62, and pass completely through the nut 68 to establish communication between the counterbore 60 of the outboard cone 52 and the region beyond the opposite end of the nut 68. In that region the nut 68 has a cylindrical surface 72 which, although lying beyond the holes 70, has a lesser diameter than the major surface area of the nut 68. The nut 68 retains the cone 52 of the outboard bearing 8 on the spindle 2, and indeed retains the cones 52 of the two bearings 6 and 8 between it and the collar 20 that fits against the shoulder 14 at the opposite end of the cylindrical surface 12. It further serves to establish the setting for the bearings 6 and 8.

Fitted around the cylindrical surface 12 of the spindle 2 between the the two cones 52 is a ring-shaped spacer 74 which serves to isolate the slots 64 of the two cones 52 from the interior of hub 4, all without affecting the setting of the bearings 6 and 8. To this end, the spacer 74 at its ends contains counterbores 76 which open toward and receive end ribs of the cones 52, that is the ribs on which the front faces of the cones 52 lie. The counterbores 76 contain O-ring seals 78 which fit over and bear against the cylindrical surfaces on the end ribs of the two cones 52, thereby establishing fluid-tight barriers between the ends of the spacer 74 and the cones 52. The spacer 74 in the region between its two counterbores 76 is somewhat larger than the spindle 2, so that a gap exists between the spacer 74 and the cylindrical surface 12 of the spindle 2, and this gap enables air to flow between the slots 64 in the two cones 52.

The spindle 2 also carries an end disk 82 which is provided with a threaded stud 84 that threads into the spindle 2 at the inner end of the socket 10. To insure that disk 82 is perfectly centered with respect to the spindle 2, the disk 82 has an axially directed pilot portion 86 which fits into the cylindrical socket 10. The disk 82 extends radially outwardly beyond the ends of the axial holes 70 in the nut 68 and at its greatest diameter has an axially directed lip 88 which projects over and around the cylindrical surface 72 of the nut 68. Indeed, the narrow space between the lip 88 and the cylindrical surface 72 of the nut 68 is occupied by another O-ring seal 90 which serves to establish a fluid barrier between the nut 68 and the disk 82 outwardly from the axial holes 70 of the former. The end disk 82 also projects axially beyond the spindle in the form of a nose portion 92 which has a cylindrical sealing surface 94 that is machined to a high grade finish, with its axis coinciding with the axis X of rotation, so that the surface 94 lies concentric with the raceways of the bearings 6 and 8.

Indeed, the pilot portion 86, by centering the end disk 82 establishes the concentricity. The end disk 82 contains a channel 96 which at one end opens toward the nut 68 inwardly from the O-ring seal 90. Here the channel 96 opens into the narrow annular space into which the axial holes 70 of the nut 68 open so that the holes 70 and channels 96 are in communication. The other end of the channel 96 opens out of the end face of the nose portion 92, which is of course located radially inwardly from the sealing surface 94.

The end disk 82 at the outboard end of the spindle 2 projects into a ring-like seal carrier 100 that is attached to the hub 4 at the corresponding end of the hub 4. The carrier 100 has an axially directed cylindrical surface 102 which fits snugly into the outboard bore 32 of the hub 4 beyond the cup 54 of the outboard bearing 8, and a shoulder 104 which is presented toward the end face of the hub 4. Indeed, the seal carrier 100 is fastened firmly to the hub 4 with machine screws 106 that pass through the carrier 100 and thread into the hub 4. To establish a fluid barrier between the hub 4 and carrier 100, a gasket 108 is fitted between the two at the shoulder 104, and the gasket 108 is of course compressed by the screws 106. Actually, the cylindrical surface 102 is interrupted by an annular groove 110 which lies at the inner end of the radial port 44 in the hub 4. The cylindrical surface 102 is also interrupted by an O-ring seal 112 which is compressed between the carrier 100 and the hub 4 at the surface of the outboard bore 32 for the latter. The seal 112 likewise establishes a fluid barrier between the carrier 100 and the hub 4. Thus, the annular groove 110 and the inner end of the radial port 44 are isolated between gasket 108 and the O-ring seal 112.

The seal carrier 100 projects axially a slight distance beyond the end face on the nose portion 92 of the end disk 82, and in the region of the nose portion 92 of the disk 82, it has a bore 114 which leads outwardly from a narrow lip that lies along end disk 82, and that lip forms a shoulder 116 at the end of the bore 114. Thus, the bore 114 opens out of the carrier 100 away from the end of the spindle 2. The cylindrical sealing surface 94 of the end disk 82 lies within the bore 114 of the carrier 100, concentric to the surface of the bore 114.

The seal carrier 100 also contains a channel 118 which leads outwardly from the bore 114 to the annular groove 110 into which radial port 44 of the hu 4 opens. The inner end of the channel 118 lies close to an end face 120 on the carrier 100, and that face 120 is squared off with respect to the axis X. Against the end face 120, a circular end plate 122 is fastened to the seal carrier 100 with machine screws 124 that pass through the plate 122 and thread into the carrier 100. Actually, the screws 124 compress a gasket 126 between the end plate 122 and the end face 120 of the seal carrier 100 to effect a fluid-light barrier between the two. The end plate 122 lies slightly beyond the nose portion 92 on the end disk 82 that is carried by the spindle 2 to close one end of a chamber 128 that exists between the two. Actually, the carrier 100 and end plate 122 together form a closure which serves to establish several surfaces that define the chamber 128 at the outboard end of the spindle 2. The channel 96 of the end disk 82 opens into the chamber 128, and so does the channel 118 in the seal carrier 100.

The chamber 128 is isolated from the interior of the hub 4 and the bearings 6 and 8 within that interior by a seal 130 which is carried by the seal carrier 100 and establishes a live fluid barrier with the end disk 82 along the nose portion 92 of that disk The seal 130 includes a metal case 132 which is pressed into the bore 114 of the carrier 100 and against the shoulder 116 at the end of the bore 114 to establish a fluid tight static barrier along both. The case 132 also extends along the nose portion 92 of the end disk 82, but does not contact the sealing surface 94 on that portion. In addition, the seal 130 has an elastomeric seal element 134 which is bonded to the case 132 from which it is directed generally axially along the cylindrical surface 94 on the nose portion 92 of the end disk 82. Since the elastomeric seal element 134 projects toward the end plate 122, it lies mostly within the chamber 128. It has a flexible lip 136 which bears against the cylindrical sealing surface 94 of the end disk 82, and it is along this lip 136 that the actual live or dynamic fluid barrier exists. The elastomeric seal element 134 carries a garter spring 138 which urges the lip 136 that is closest to the end plate 122 snugly against the sealing surface 94. The seal 130 is a traditional pressure seal.

In operation, the hub 4 and the road wheel W that it carries rotate about the spindle 2 on the bearings 6 and 8, and the bearings 6 and 8 transfer radial loads as well as thrust loads from the spindle 2 to the hub 4. Notwithstanding this rotation, the interior of the pneumatic tire T, which contains pressurized air, remains in communication with the source of pressurized air on the vehicle. In this regard, an open passage exists between the air line 28 that is attached to the spindle 2 and the air line 46 that is attached to the hub 4. Actually, that passage may be envisioned as two passageways each of which opens into the isolated chamber 128 at the end of the spindle 2.

The first passageway begins at the inboard end of the spindle 2, where the air line 28 connects with the collar 20 that fits against the shoulder 14 of the spindle 2. That passageway includes the channel 26 through the collar 20. It also resides within the counterbores 60 and axial slots 64 of the two cones 52, as well as within the confines of the spacer 74. At the counterbore 60 of the outboard cone 52 the passageway lies within the axial holes 70 of the nut 68 and within the channel 96 of the end disk 82. The channel 96 opens into the isolated cavity 128. The second passageway begins at the air line 46 where it connects with the hub 4 and includes the radial port 44 of the hub 4 and the annular groove 110 and channel 118 of the seal carrier 100.

Throughout the entire length of the passage formed by the two passageways and the chamber 128 only one live fluid barrier exists, and that is at the seal 130, particularly at the lip 136 of the elastomeric seal element 134. That lip 136 bears against the machined sealing surface 94 on the nose portion 86 of the end disk 82. Indeed, the pressurized air within the chamber 128 serves to urge at least lip 136 snugly against the surface 94 inasmuch as the back surface of that portion of the elastomeric sealing element 134 along which the lip 136 is located is exposed to the pressurized air of the chamber 128. The bearings 6 and 8 operate at atmospheric pressure, the cavity in which they are located being vented at the relief valve 42 in the hub 4. Thus, the lubricant from the bearings 6 and 8 will not migrate toward the pneumatic tire T or toward the source of compressed air.

Figure 2:
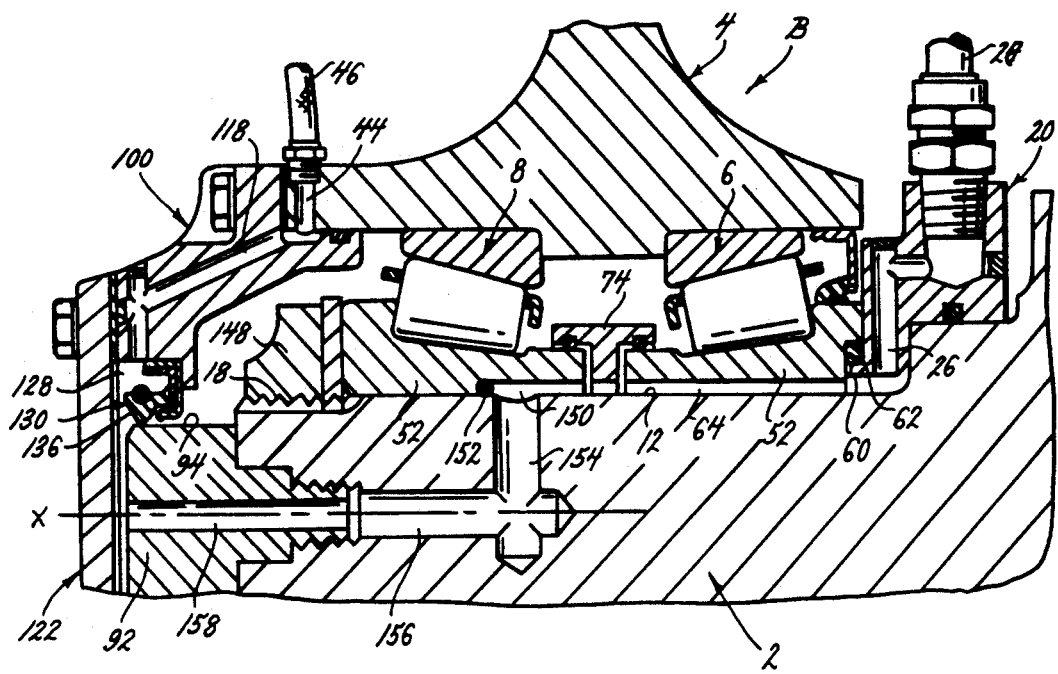
FIG. 2 is a half sectional view of a modified mounting and showing in phantom lines an alternate location for the passageway along the spindle.

A modified wheel mounting B (FIG. 2) is very similar to the mounting A, except that the passage through the mounting B does not pass through a nut 148 which engages the threads 18 to hold the cones 52 in place, nor does the outboard cone 52 contain slots 64. Instead, the outboard cone 52 has a deep counterbore 150 which opens out of its front face and into the interior of the spacer 74. At the inner end of the counterbore 150, the cone 52 is fitted with an O-ring seal 152 which establishes a fluid-tight barrier between the cone 52 and the cylindrical surface 12 of the spindle 2. In this region, the spindle 2 contains a radial bore 154 which intersects an axial bore 156, and the axial bore 156 aligns with and opens into another axial bore 158 in the end disk 82. The latter opens into the isolated chamber 128. Thus, the interior of the spacer 74 communicates with the chamber 128 through the counterbore 150 of the outboard cone 52, the radial and axial bores 154 and 156 of the spindle 2 and the axial bore 158 of the end disk 82.

Figure 3:
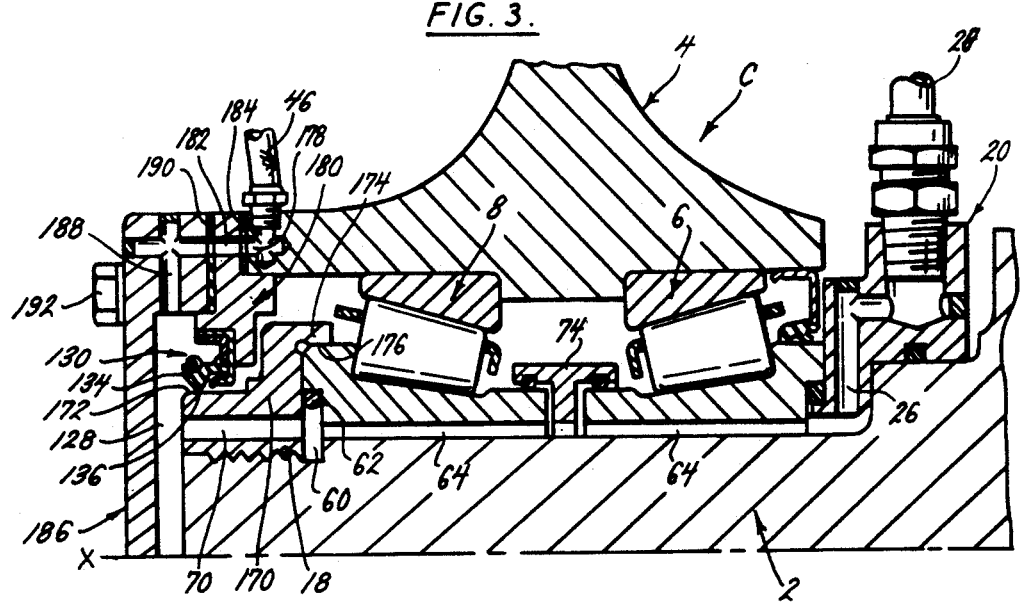
FIG. 3 is a half sectional view of another modified mounting.

Another modified wheel mounting C (FIG. 3) is likewise very similar to the mounting A and indeed resembles the mounting A in virtually every respect out to the back face of the outboard cone 52. Moreover, it has a nut 170 that positions the outboard cone 52, and like the nut 68, the nut 170 has axial holes 70. The nut 170, in addition to its axial holes 70, has an outwardly presented sealing surface 172 which is cylindrical and leads out to the outboard end of the nut 170. At its other end the nut 170 projects radially beyond the sealing surface 172 where it is provided with an axially directed lip 174 having an inside cylindrical surface 176 that lies concentric to the cylindrical sealing surface 172. The diameter of the surface 176 is essentially that of the outer diameter for the thrust rib at the back face of the outboard cone 52, so that as the nut 170 is turned down over the threads 18 far enough to bring the lip 174 over the thrust rib of the cone 52, the cylindrical sealing surface 172 for the nut 170 is assured of being concentric with the raceways of the bearings 6 and 8. In addition, the nut 170 has sockets which open away from the bearings 6 and 8 to accommodate the lugs of a spanner-type wrench for turning the nut 170.

The radial port 44 at the outboard end of the hub 4 for the mounting C, instead of passing completely through the hub 4 to the outboard bore 32, terminates within the hub 4 where it intersects an axial port 178 that extends out to the end of the hub 4. The mounting C likewise has a seal carrier 180 which is fastened against the end of the hub 4, and it like the carrier 100, has a bore 114 that ends at the shoulder 116. The cylindrical surface of the bore 114 in the carrier 180 circumscribes the cylindrical sealing surface 172 of the nut 170. Here the seal 130 is fitted between the carrier 180 and the nut 170, its case 132 being pressed into the bore 114 ad against the shoulder 116 and its elastomeric sealing element 134 bearing against the sealing surface 172 at its lip 136.

The seal carrier 180 contains an axial bore 182 which aligns with the axial port 178 in the hub 4. Between the opposing end faces of the hub 4 and carrier 180 lies a gasket 184.

Finally, the mounting C has an end plate 186 which fits against the seal carrier 180, but the plate 182 is relieved on its inside surface to provide clearance for the carrier 180, the nut 170, and the end of the spindle 2, and this closes the chamber 128 at the end of the mounting C. The end plate 186 contains a channel 188 which at one end opens into the enclosed chamber 128 and at its opposite end aligns with the axial bore 182 in the seal carrier 180. Fitted between the end plate 186 and the carrier 180 is another gasket 190 which creates a fluid tight barrier at that location.

The end plate 186 is attached to the hub 4, with the end ring 180 interposed between them, by machine screws 192 which pass axially through the plate 186 and seal carrier 180 and thread into the hub 4. When the screws 192 are turned down, they compress the gasket 184 between the hub 4 and seal carrier 180 and the gasket 190 between the end ring 180 and the end plate 186.

The first passageway through the mounting C, that is the passageway which extends along the spindle 2 to the isolated chamber 126, like the first passageway of the mounting A, includes the channel 26 of the collar 20 and the counterbores 60 and the slots 64 of the cones 52 as well as the interior of the spacer 74. It also resides in the hole 70 of the nut 170, and indeed at the ends of the holes 70 opens directly into the isolated chamber 128. The second passageway includes the radial and axial ports 44 and 178 of the hub 4, as well as the bore 182 of the seal carrier 180 and the channel 188 of the end plate 188. The channel 186 opens into the chamber 128.

Figure 4:
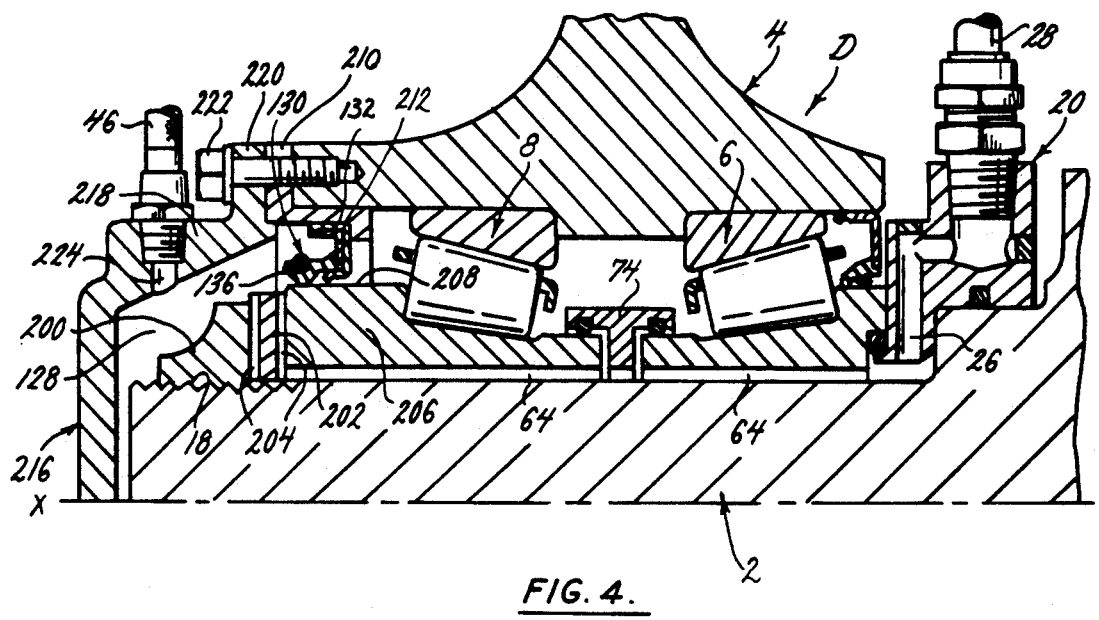
FIG. 4 is a half sectional view of still another modified mounting.

Still another modified wheel mounting D (FIG. 4) bears a close resemblance to the mounting C in that its bearings 6 and 8 have cones 52 which are provided with slots 64 and are separated by a spacer 74 all to establish a passage along the spindle 2. The two cones 52 are held on the spindle 2 by a nut 200 which resembles the nut 148 of the mounting B, but the nut 200 does not bear against the back face of the outboard cone 52 through a conventional washer and furthermore does not lie beyond the isolated chamber 128. Instead, the nut 200 bears against a washer 202 having radial slots 204 and these slots 204 effect communication between the slots 64 of the outboard cone 52 and the isolated chamber 128, within which the nut 200 is located.

In this regard, the seal 130 forms a live or dynamic fluid barrier with the outboard cone 52, so the isolated chamber 128 lies axially beyond the back face of the cone. To accommodate the seal 130, the outboard cone 52 is lengthened with all of its increased length being in its thrust rib 206. That rib is ground to provide it with a smooth exterior surface 208 that is concentric with the raceway of that cone 52. The lip 136 of the seal 130 bears against the cylindrical surface 208 on the extended thrust rib 206 of the outboard cone 52.

The case 132 of the seal 130, on the other hand, fits into a ring or seal carrier 210 that projects into the outboard bore 32 of the hub 4 and at its one end is provided with a shoulder 212 against which the seal case 132 bears. Indeed, the seal case 132 forms a static fluid barrier with the seal carrier 210. At its opposite end, the seal carrier 210 has a flange 214 that fits against the end of the hub 4.

Whereas the inboard end of the isolated chamber 128 is closed with the seal 130, the outboard end is enclosed with an end cover 216 which is somewhat bowl-shaped to accommodate nut 200 and the end of the spindle 2 over which the nut 200 is threaded. The cover 216 extends across the end of the spindle 2 and has a circular side wall 218 to give it depth as well as a flange 220 at the end of the side wall 218. The flange 220 fits against flange 214 on the seal carrier 210. Indeed, the two flanges 220 and 214 are clamped firmly together against the outboard end face of the hub 4 by bolts 222 which pass through the flange 220 and 214 and thread into the hub 4.

The side wall 218 of the end cover 216 contains a port 224 to which the air line 46 is connected at its threaded coupling.

This invention is intended to cover all changes and modifications of the example of the invention herein chosen for purposes of the disclosure which do not constitute departures from the spirit and scope of the invention.

What is claimed is:

1. A mounting for a wheel having a pneumatic tire, said mounting comprising: a nonrotating spindle having inboard and outboard ends; a hub located around the spindle and having the wheel attached to it; bearings interposed between the hub and the spindle to enable the hub to rotate on the spindle about an axis of rotation, the bearings having inner and outer races located around the spindle and within the hub, respectively, and opposed raceways on the races, the bearings further having rolling elements located between and contacting opposed raceways of the inner and outer racer; the inner race of each bearing having an axially directed channel which lies along the spindle to form, with the spindle, a portion of a first air passageway that extends between the inboard and outboard ends of the spindle, the inner races being spaced axially from each other; connecting means at the inner races of the bearings for connecting the channels in the inner races so that they are in communication and for preventing air from escaping from the first passageway into the region between the races, the connecting means including a separator ring located around the spindle and between the inner races and means for establishing a fluid tight barrier between the separator ring and the inner races, the first passageway extending through the separator ring; a closure attached to the hub and extending across the outboard end of the spindle to close one end of a chamber that lies at least in part beyond the outboard end of the spindle and into which the first passageway opens at the outboard end of the spindle; sealing means for establishing a fluid barrier generally between the hub and the spindle to thereby close the other end of the chamber, the sealing means further being located between the outboard end of the first passageway and the rolling elements of the bearings so that the rolling elements of the bearings are isolated from the chamber; and means for providing a second passageway between the chamber and the interior of the tire.

2. A mounting according to claim 1 wherein the second passageway is located at least in part within the hub.

3. A mounting according to claim 2 wherein the second passageway extends out to the exterior surface of the hub.

4. A mounting according to claim 1 wherein the first passageway is accessible along the exterior of the spindle remote from the bearings and hub.

5. A mounting according to claim 1 wherein the sealing means includes a sealing surface located in a fixed position with respect to the spindle and an elastomeric seal element carried by the hub and bearing against the sealing surface.

6. A mounting according to claim 5 wherein the spindle has threads near its outboard end and a shoulder at the inboard end remote from the threads; wherein a nut is engaged with the threads; and wherein the inner races of the bearings are located on the spindle between the nut and the shoulder.

7. A mounting according to claim 6 wherein the first passageway extends through the nut.

8. A mounting according to claim 7 wherein the sealing surface is on the nut.

9. A mounting according to claim 6 wherein the sealing surface is on one of the bearings.

10. A mounting according to claim 9 wherein the first passageway extends radially along the nut.

11. A mounting means according to claim 5 wherein the closure includes a ring located against the end of the hub, and the sealing means includes an end disk fitted to the spindle at its outboard end and having the sealing surface thereon, and a seal carried by the ring and contacting the sealing surface on the end disk to establish the dynamic fluid barrier along the sealing surface of the end disk.

12. A mounting according to claim 1 wherein the raceways and rolling elements are configured to transfer radial loads between the spindle and hub and are further configured such that the rolling elements of one row transfer thrust loads in one axial direction and the rolling elements of the other row transfer thrust loads in the opposite axial direction.

13. A mounting according to claim 1 wherein the sealing means includes a sealing surface carrier by the spindle and a seal carried by the hub and having a flexible lip which contacts the sealing surface.

14. A mounting for a wheel that rotates about an axis of rotation and has a pneumatic tire, said mounting comprising: a nonrotating spindle having inboard and outboard ends, the spindle also having a shoulder at its inboard end and thread at its outboard end; a nut engaged with the threads and being spaced axially from the shoulder, the nut having a passageway extending through it; a fitting located at the inboard end of the spindle; a pair of inner bearing races located on the spindle between the nut and the shoulder, the inner races having raceways which are presented outwardly, the inner races also having axially directed channels which lie along the spindle and together with the outer surface of the spindle form portions of a first air passageway which extends between the fitting and the outboard end of the spindle and also includes the passage in the nut; connecting means located between the inner races and around the spindle for connecting the channels of the two inner races such that air will not escape in the region between the two inner races; a hub located around the spindle; a pair of outer bearing races fitted into the hub and having raceways which are presented inwardly toward the raceways of the inner races; rolling elements located between and contacting the raceways of the inner and outer races; a closure attached to the hub generally around the outboard and of the spindle and extending across the outboard end of the spindle to form a chamber that likewise extends across the end of the spindle and into which the first passageway opens at the outboard end of the spindle; a sealing surface carried by the spindle between the outboard end of the first passageway and the rolling elements of the bearings; a seal carried by the hub and contacting the sealing surface to form a fluid barrier which isolates the chamber from the rolling elements; and a second passageway extending between the chamber and the interior of the tire.

15. A mounting according to claim 14 wherein the sealing surface is on one of the inner races.

16. A mounting according to claim 14 and further comprising an end disk secured firmly to the spindle; and wherein the sealing surface is on the end disk where its axis coincides with the axis of rotation.

17. A mounting according to claim 14 wherein the sealing surface is on the nut and its axis coincides with the axis of rotation.

18. A rotation according to claim 14 wherein the second passageway extends through the closure.

19. A mounting according to claim 14 wherein a spacer is located between the two inner races; and wherein the first passageway extends through both of the races, the spacer and the nut.

20. A mounting according to claim 14 wherein an end disk is attached to the spindle and projects beyond the outboard end of the spindle into the chamber; wherein the sealing surface is cylindrical and is located on the end disk; and wherein the first passageway extends through the end disk.

21. A mounting according to claim 14 wherein the sealing surface is cylindrical and is on the nut and the first passageway extends axially through the nut.

22. A mounting according to claim 14 wherein the sealing surface is cylindrical and is on the outboard inner race.

23. A mounting according to claim 14 wherein the inner races are spaced axially from each other, and wherein the connecting means includes a separator ring located around the spindle and between the inner races, and means for establishing fluid tight barriers between the separator ring and the inner races; and wherein the first passageway extends through the separator ring.

24. A mounting for a wheel having a pneumatic tire, said mounting comprising: a nonrotatable spindle having inboard and outboard ends, the spindle having a shoulder at its inboard end; a clamping device located at the outboard end of the spindle; a hub located around the spindle and having the wheel attached to it; two single row tapered roller bearings interposed between the spindle and the hub to enable the hub to rotate on the spindle about an axis of rotation, each bearing having a cup that is fitted into the hub and is provided with a tapered raceway that is presented inwardly, a cone that is located around the spindle and is provided with tapered raceway that is presented outwardly and also a thrust rib projected outwardly beyond the large end of the tapered raceway, and tapered rollers located between the cut and cone where they contact the raceways of the cup and cone and have their large ends against the thrust rib of the cone, the two cones being located between the shoulder of the spindle and the clamping device and having axially directed channels that are presented toward the surface of the spindle; a sealing surface located at the outboard end of the spindle axially beyond rollers of the two bearings, the sealing surface being fixed with respect to the cones of the bearings; a separator ring encircling the spindle between the cones of the two bearings and means for establishing fluid-tight barriers between the ring and the cones so as to isolate the channels of the cones from the region between the bearings while maintaining communication between the channels of the two cones; a seal carried by the hub and having an elastomeric sealing element which contacts the sealing surface to form a fluid barrier between the surface and the hub, the seal forming the end of an air chamber located at the outboard end of the spindle; means for closing the other end of the chamber; the channels in the cones of the two bearings forming part of a first air passageway that extends from the inboard to the outboard end of the spindle; passes through the separator ring and opens into the air chamber; and means for providing a second passageway between the chamber and the interior of the tire.

* * * * *